(12) United States Patent
Morin

(10) Patent No.: US 11,080,279 B2
(45) Date of Patent: *Aug. 3, 2021

(54) DYNAMIC DATA MANAGEMENT

(71) Applicant: salesforce.com, inc., San Francisco, CA (US)

(72) Inventor: Raymond Morin, Odessa, FL (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,346

(22) Filed: Jan. 31, 2017

(65) Prior Publication Data

US 2017/0139992 A1 May 18, 2017

Related U.S. Application Data

(63) Continuation of application No. 13/559,409, filed on Jul. 26, 2012, now Pat. No. 9,569,511.

(Continued)

(51) Int. Cl.
*G06F 16/00* (2019.01)
*G06F 16/2453* (2019.01)
(Continued)

(52) U.S. Cl.
CPC .... *G06F 16/24544* (2019.01); *G06F 16/2282* (2019.01); *G06F 16/248* (2019.01);
(Continued)

(58) Field of Classification Search
CPC ........ G06F 17/30339; G06F 17/30914; G06F 11/3476; G06F 17/30563; G06F 17/30477; G06F 17/3061; G06F 17/30424; G06F 17/30595; G06F 17/30386; G06F 17/30498; G06F 17/30657; G06F 17/30286;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Non-Final Office Action for U.S. Appl. No. 13/559,409 dated Aug. 25, 2014, 14 pages.

(Continued)

*Primary Examiner* — Michelle N Owyang
(74) *Attorney, Agent, or Firm* — Jaffery Watson Mendonsa & Hamilton LLP

(57) ABSTRACT

An interface for users to gain access and manipulate unstructured data is provided. In response to receiving a user query associated with a first database format, a system can request unstructured data associated with a second database format from a second database. The unstructured data can include a set of data groups where each data group has a set of values. Each value can be associated with a different tag. To generate a structured database, some embodiments can determine the number of data groups and the number of unique tags across the data groups and populate the table with data from the unstructured data. Subsequently, the system can apply the user query to the table to obtain a query result and transmit the query result to the user device.

20 Claims, 10 Drawing Sheets

Related U.S. Application Data

(60) Provisional application No. 61/527,238, filed on Aug. 25, 2011.

(51) Int. Cl.
*G06F 16/25* (2019.01)
*G06F 16/80* (2019.01)
*G06F 16/248* (2019.01)
*G06F 16/22* (2019.01)
*G06F 16/2458* (2019.01)
*G06F 16/33* (2019.01)

(52) U.S. Cl.
CPC .......... *G06F 16/2471* (2019.01); *G06F 16/25* (2019.01); *G06F 16/258* (2019.01); *G06F 16/3331* (2019.01); *G06F 16/3337* (2019.01); *G06F 16/80* (2019.01)

(58) Field of Classification Search
CPC .......... G06F 17/30539; G06F 16/2282; G06F 16/24544; G06F 16/2471; G06F 16/248; G06F 16/25; G06F 16/258; G06F 16/3331; G06F 16/3337; G06F 16/80
USPC .................................................. 707/705–780
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,031,981 B1 | 4/2006 | DeLuca et al. |
| 7,340,411 B2 | 3/2008 | Cook |
| 7,620,655 B2 | 11/2009 | Larsson et al. |
| 7,904,363 B2 | 3/2011 | Wu |
| 8,793,231 B2 * | 7/2014 | Cragun ............... G06F 16/9558 707/696 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0037037 A1 | 2/2003 | Adams et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186826 A1 | 9/2004 | Choi et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0082502 A1 | 4/2008 | Gupta |
| 2010/0211609 A1 | 8/2010 | Xiong et al. |
| 2011/0191394 A1 | 8/2011 | Winteregg et al. |

(56) References Cited

U.S. PATENT DOCUMENTS

2012/0239612 A1* 9/2012 George ................. G06F 16/254
707/602
2012/0254241 A1 10/2012 Bhattacharya et al.
2016/0328470 A1* 11/2016 Indeck .................. G06F 16/353

OTHER PUBLICATIONS

Final Office Action for U.S. Appl. No. 13/559,409 dated Feb. 3, 2015, 20 pages.
Non-Final Office Action for U.S. Appl. No. 13/559,409 dated Jun. 25, 2015, 22 pages.
Final Office Action for U.S. Appl. No. 13/559,409 dated Dec. 4, 2015, 27 pages.
Non-Final Office Action from U.S. Appl. No. 13/559,409 dated Apr. 8, 2016, 23 pgs.
Notice of Allowance from U.S. Appl. No. 13/559,409 dated Sep. 23, 2016, 43 pgs.

* cited by examiner

FIG. 4A

```
SQL> @sample1
SQL> select *
  2  from table(splunk_pkg.query_view('index=na1
earliest=-24h@h latest=-7h@h sourcetype="applog166"
logRecordType="A" | evalfoo=_time | convert ctime(foo) |
fields "_*"
methodNameracNoderowsProcessedcpuTimerunTime| head 20'))
  3 /
```

FIG. 4B

| cpuTime | methodName | racNode | rowsProcessed | runTime |
|---|---|---|---|---|
| 10 | query | 3 | 3 | 34 |
| 10 | query | 4 | 0 | 18 |
| 10 | query | 2 | 0 | 28 |
| 10 | get_server_time stamp | 7 | 0 | 14 |
| 20 | query | 1 | 0 | 29 |
| 10 | query | 7 | 1 | 20 |
| 10 | retrieve | 2 | 32 | 36 |
| 90 | query | 3 | 1 | 98 |
| 20 | update | 7 | 1 | 57 |
| 20 | query | 4 | 0 | 36 |
| 0 | insert | 1 | 1 | 124 |
| 10 | query | 4 | 0 | 16 |
| 20 | query | 6 | 0 | 24 |
| 10 | query | 4 | 20 | 12 |
| 10 | query | 7 | 1 | 20 |
| 120 | query | 1 | 200 | 241 |
| 10 | query | 2 | 0 | 31 |
| 10 | query | 2 | 32 | 19 |
| 20 | update | 7 | 1 | 56 |
| 10 | get_user_info | 3 | 0 | 25 |

FIG. 6A

```
SQL> @join
SQL> select    "organizationId", org_name, sum("runTime"),
sum("cpuTime")                                                          602
  2  from table(splunk_pkg.query_view('index=nal
  3           earliest=-24h@h latest=-7h@h
  4           sourcetype="applog166" logRecordType="A"
  5              | evalmandm_timestamp=_time | convert
ctime(mandm_timestamp) | fields "_*" cpuTime datacenter
organizationIdrunTimemandm_timestamp
  6              | head 300')) foo,
  7      mandm_etl.work_mandm_org_lic_curr_snapx
  8  where "runTime" > 100
  9  and   foo."organizationId" = x.org_id
 10  and   ORG_STATUS = 'ACTIVE'
 11  and   USER_LICENSE_NAME = 'Salesforce'
 12  group by "organizationId", org_name
 13  order by 1
 14  /
```

| organizationId | ORG_NAME | SUM("RUNTIME") | SUM("CPUTIME") |
|---|---|---|---|
| 00D000000000hgPu | Omniture | 2691 | |
| 00D00000000hAzi | Seagate Technology LLC | | 580 |
| 00D30000000C0c | Blue Ridge Numerics | 12203 | 10450 |
| 00D3000000008DPf | EMC BRS | 124 | 0 |
| 00D30000000WYJ | Imation | 2104 | 610 |
| 00D300000002hd | Kaiser Permanente | 753 | 440 |
| 00D3000000901KDX | TransUnion LLC | 1986 | 650 |
| 00D3000000066BQ | Ali DuPont | 1415 | 170 |
| 00D300000000eVGf | LogMeIn, Inc. | 175 | 50 |
| 00D300000006Vym | HealthStream, Inc. | 8640 | 5800 |
| 00D3000000006len | Dun & Bradstreet Inc. | 12057 | 500 |
| 00D30000000072JQ | Avaya | 965 | 4270 |
| 00D300000000741j | AKEVA T&D | 957 | 750 |
| 00D30000000RuiL | AutoDesk | 153 | 100 |
| 00D3000000008rw | Quintiles InnovexAbraxis | 7854 | 920 |
| 00D300000000LLy2 | SagurasMolciva | 175 | 60 |
| 00D3000000UNwr | PREM Group Inc. | 5146 | 100 |
| 00D300000000XLyW | Easyrent Real Estate Service Ltd | 2741 | 130 |
| 00D300000000Y3Qf | Progressive Media | 729 | 570 |
| 00D300000000dbAD | MSCI Limited | 459 | 30 |
| | | 153 | 10 |

DYNAMIC DATA MANAGEMENT

CROSS-REFERENCE TO RELATED APPLICATION

This United States patent application is a continuation of, and claims priority to U.S. patent application Ser. No. 13/559,409 filed Jul. 26, 2012 entitled "DYNAMIC DATA MANAGEMENT," which claims priority to U.S. Provisional Patent Application No. 61/527,238, filed Aug. 25, 2011, entitled "METHODS AND SYSTEMS FOR QUERYING TWO OR MORE DISPARATE DATABASE," the entire contents of which are incorporated herein by reference.

BACKGROUND

The present disclosure relates generally to, among other things, the accessing of data in an electronic environment, and in particular to dynamically transforming unstructured data into structured data based on a user query.

As the number of computing users increase, machine data generated by applications, systems, and information technology infrastructure that run a business increases. Specialized search engines (e.g., Splunk®) can sort through vast amounts of unstructured and dynamic machine data (also referred to as unstructured data) such as event logs, performance information, file system information, etc. and provide the compiled data to users. However, the complexity of the unstructured data presented to users prevents many users from freely comprehending, accessing, and manipulating the data. Additionally, unstructured data such as event logs is constantly generated by the bulk, constantly changing and is fairly unpredictable. This adds to the difficulty in using such unstructured data. It is therefore desirable to provide new methods and system for accessing unstructured data.

BRIEF SUMMARY

Certain embodiments of the invention relate to transformation of data from an unstructured data format (e.g., machine data stored in a distributed, non-relational, semi-structured database) to a structured data format (e.g., data in a relational database). After the transformation, users can conveniently access and manipulate the structured data. In some embodiments, a transformation module can receive a user query and retrieve and transform unstructured data in response to receiving the user query. The transformation module in some embodiments can perform one or more operations on the transformed data based on the user query. The transformation module can then present the query results to the user upon performing the one or more operations specified by the user query. Without having to dive into complex unstructured data and without having to learn unstructured data formats, users can conveniently access and manipulate data transformed from unstructured data.

Certain aspects of the invention relate to systems and methods for accessing data. A computer system can receive a user query for unstructured data from a user device. The user query can be associated with a first database format. In response to receiving the user query, the computer system can request the unstructured data from a second database that stores the unstructured data. The computer system can receive the unstructured data from the second database. The unstructured data can include a set of data groups where each data group has a set of one or more values, each value of a respective data group being associated with a different tag. The unstructured data can be associated with a second database format. In some embodiments, the computer system can determine a first number of data groups in the unstructured data. The computer system can then determine a second number of unique tags across the data groups of the unstructured data. The computer system can create a table in the first database format, where the number of columns of the table is based on the second number of unique tags, and where the number of rows of the table corresponds to the first number of data groups. The computer system can populate each row of the table with the unstructured data of a respective data group by adding each value to the column corresponding to the associated tag. The computer system can apply the user query to the table to obtain a query result and transmit the query result to the user device.

It is advantageous to secure a finite amount of unstructured data, convert the secured unstructured data to a format compatible with a structured format, and allow users to perform user queries on the converted data. The transformation of unstructured data into a format users are familiar with permits users to freely access, analyze, and manipulate the data in the desired format.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIGS. 4A-4B illustrate an example of a user query including a direct search for unstructured data and query results returned in a structured database format in accordance with some embodiments.

FIGS. 6A-6B illustrate an example of user query that retrieves and joins unstructured data with structured data in accordance with one embodiment.

DETAILED DESCRIPTION

Figure 1:
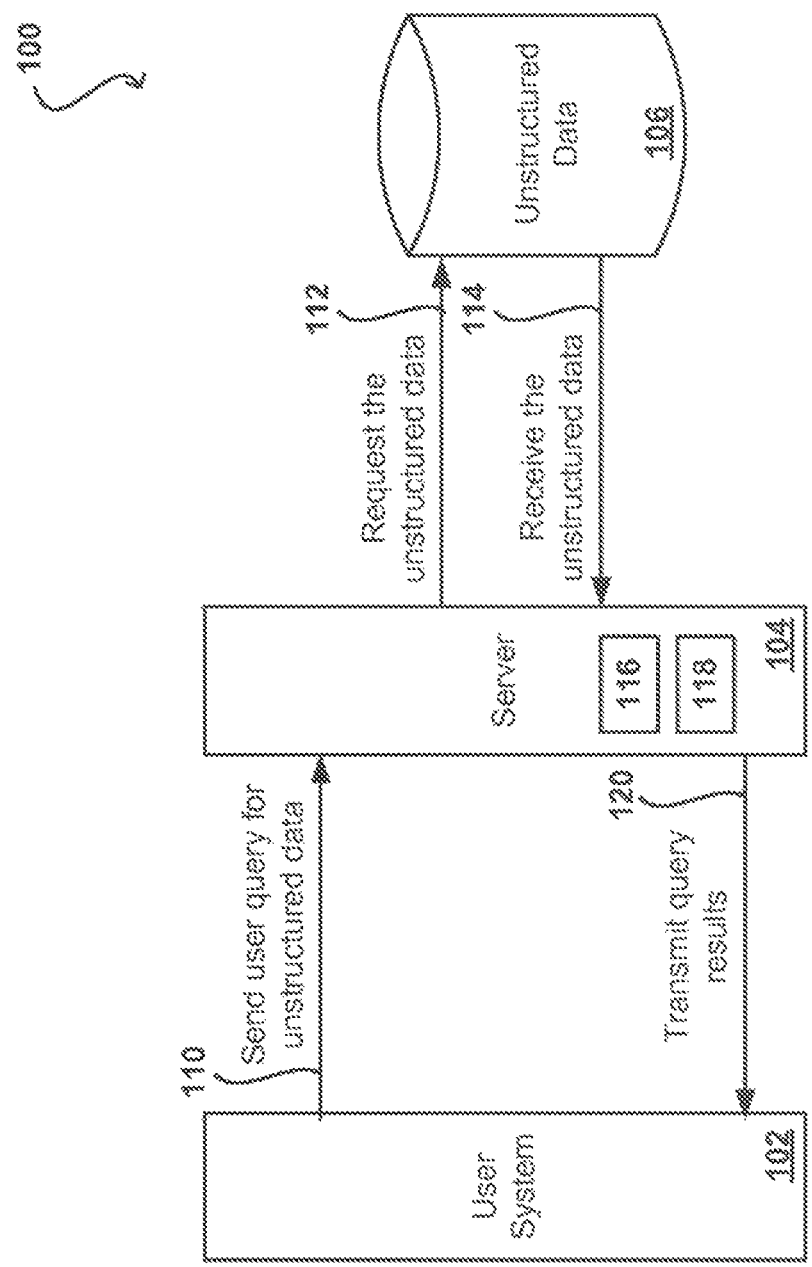
FIG. 1 illustrates a flow of requests or calls for dynamically accessing unstructured data that can be used in accordance with one embodiment.

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Certain embodiments of the invention provide a user interface that enables a user to specify, using a structured data format, a query to perform an operation on unstructured data associated with an unstructured data format. In some embodiments, a server can transform unstructured data associated with an unstructured data format (e.g., machine data stored in a distributed, non-relational, semi-structured database) to structured data in a structured data format (e.g., data in a relational database table). After the transformation, users can conveniently access and manipulate the structured data using the structured data format.

In some embodiments, a transformation module can receive a user query and retrieve and transform unstructured data in response to receiving the user query. The transformation module in some embodiments can perform one or more operations on the transformed data based on the user query. The transformation module can then present the query results to the user upon performing the one or more operations specified by the user query. Without having to dive into the complexities of unstructured data, users can conveniently access and manipulate data transformed from unstructured data.

Unstructured and dynamic machine data collected at various data centers can provide a definitive record of transactions, customer activity and/or behavior, security threats, system health, fraudulent activity, etc. In some embodiments, unstructured, dynamic machine data can include data generated in real-time from various applications, servers, network devices, or security devices including logs (e.g., app logs, web access logs, web proxy logs, audit logs, syslogs), config files, messages, alerts, scripts, etc. Specialized search engines can capture and analyze real-time and historical machine data in order to improve service, identify trends, mitigate risks, improve operational visibility, etc. In some embodiments, the unstructured data can be time-series based and thereby allow retrieval of unstructured data generated within a specified time interval. However, as mentioned, the complex format of the unstructured data prevents many users from freely accessing, analyzing, and manipulating the vast amounts of gathered data. Some embodiments can transform unstructured and dynamic machine data into structured data such that users can conveniently access and specify various operations to be performed on the transformed, structured data.

Structured data in some embodiments can be compatible with a format or a programming language (e.g., Structured Query Language (SQL)) with which many users are familiar and that is extensively developed. Structured data can include data residing in relational databases, which can often be characterized by tables of rows and columns. Data stored within relational databases can be easily located, accessed, and manipulated according to a user's needs. For example, the data within relational databases can be analyzed using a variety of tools including Excel, Crystal Reports, etc. In order to make use of the properties of relational databases (e.g., to be able to manipulate data easily), row and column specifications need to be designed up front and the data to be inserted needs to fit into the specification for relational databases.

As search engines can collect, index, monitor, and analyze vast amounts of unstructured data, some embodiments can facilitate user manipulation of the data by transforming the unstructured data into a format with which users are more familiar and performing the user query on the transformed data. Transforming unstructured data into structured data can enable a wide variety of functions available in the format to be performed on the transformed data.

I. Client-Server Interaction

FIG. 1 illustrates a flow diagram 100 of some embodiments displaying calls or requests between a user device on the "client side" 102, and a computer system on the "server side" 104. The requests can be handled by an application programming interface (API) on the server side. The user device 102 can access and manipulate data accessible through computer system 104 upon sending one or more user queries. Computer system 104 can be an on-demand database system that has local or remote access to a database 115 that stores unstructured data. A user query can be sent to computer system 104 to retrieve unstructured data associated with an unstructured format.

In some embodiments, in order to process a user query involving unstructured data, the user query is sent to the server side where much of the processing is done. For example, computer system 104 can retrieve unstructured data and perform the data transformation from unstructured to structured when a user query is received from user device 102. While computer system 104 can perform much of the data transformation and processing on the server side, in some embodiments, user device 102 can be part of computer system 104 where the data transformation and processing performed on the client side.

In this example, a user query can be received from user device 102 at step 110 where the user query is associated with a structured database format. In some embodiments, computer system 104 can send a request to a database 106 that stores the unstructured data at step 112 in response to receiving the use query. In various embodiments, system 104 can rearrange, transform, use only some of the fields of the user request, or add additional fields to the user request received in step 110 to create the request sent at step 112. The request to database 106 can be associated with an unstructured database format. In some embodiments, the requested unstructured data can be specified by a set of parameters. For instance, the user query can indicate the set of parameters for the unstructured data, such as an index or a bucket in which data is dumped, a time interval, etc. Computer system 104 can receive the unstructured data from database 106 based on the set of parameters at 114.

In some embodiments, the unstructured data received from database 106 can include a set of data groups where each data group includes a set of field values. Computer system 104 can transform the unstructured data into structured data in a structured relational database at step 116. At step 116, computer system 104 can perform the transformation by determining the dimensions of the structured database, creating a structured database with the dimensions, and populating the structured database with unstructured data. In some embodiments, computer system 104 transforms the data by determining the number of rows and columns for a relational database table. The number of rows can correspond to the number of data groups in the unstructured data.

Each field value across the set of data groups can be associated with an identifier. In some embodiments, one or more field values in a data group can have an overlapping identifier with one or more field values in a separate data group. The number of columns can be identified by determining a number of unique identifiers across the set of data groups. Thus, computer system 104 can create a table using the determined number of rows and columns or the determined transformation configuration. Computer system 104 can populate each row with the unstructured data. The entries in the relational database can be populated by the appropriate unstructured data. As described, in some embodiments, unstructured data can be mapped to its corresponding entry based on its associated tag.

Computer system 104 can apply the user query to the relational database table at step 118 to obtain a query result. Computer system 104 can then transmit the query result to user device 102 at 120. While computer system 104 on the server side can dynamically perform the data transformation and processing in response to receiving the user query from user device 102, computer system 104 in some embodiments periodically (e.g., every 30 seconds, every 5 minutes, every 12 hours) retrieves unstructured data from database 106, performs a transformation and/or additional operations on the unstructured data.

II. Performance of a User Query on Transformed Data

As mentioned above, a transformation module in some embodiments can perform a user query on data transformed from unstructured data. In some embodiments, the transformation module can determine a transformation configuration for unstructured data in response to a user query. The transformation module can then transform then unstructured data into structured data. In some embodiments, the transformation module can perform a set of operations on the transformed structured data based on the user query. As such, the user is able to access and manipulate data transformed from unstructured data by specifying one or more operations in a user query.

Figure 2:
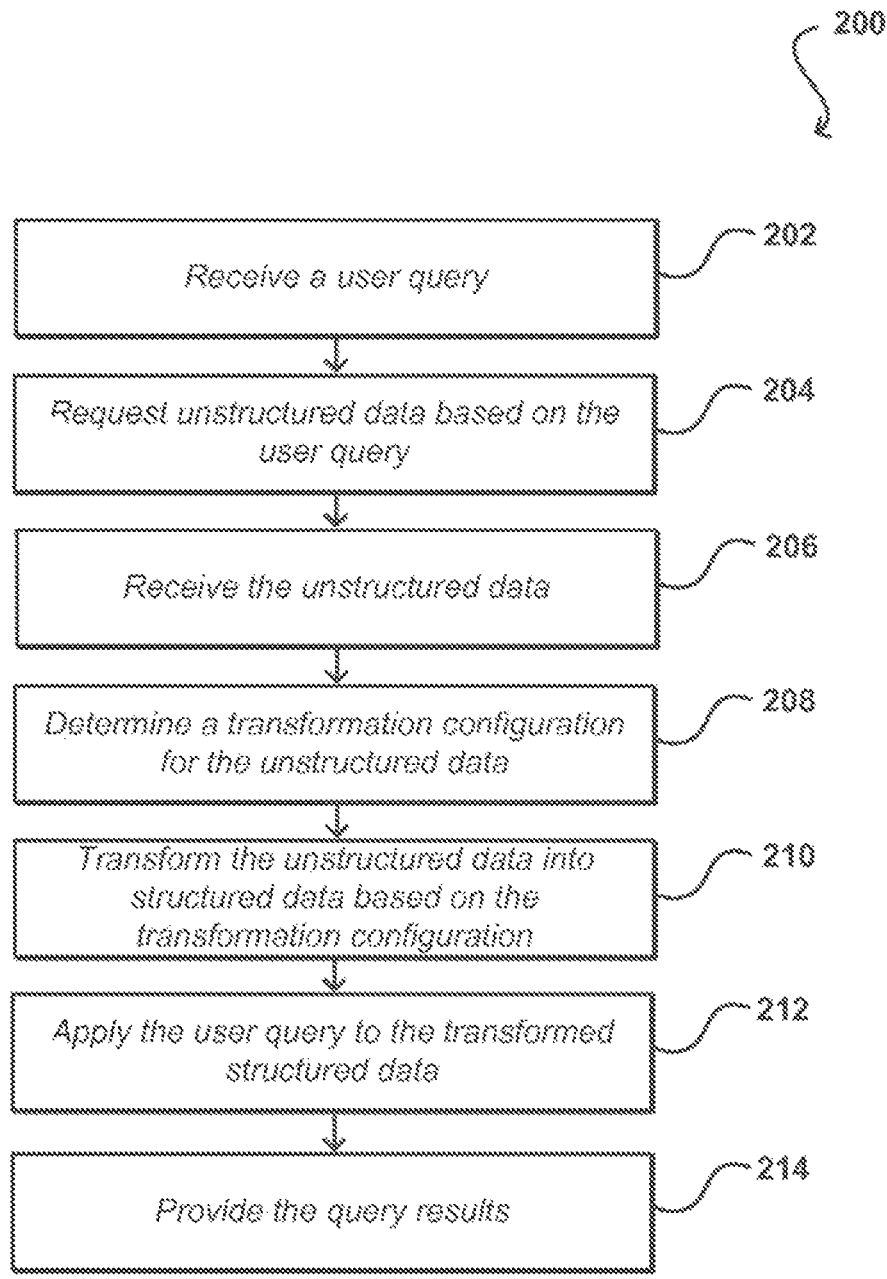
FIG. 2 illustrates a process of some embodiments for performing a user query on structured data transformed from unstructured data.

FIG. 2 illustrates a process 200 of some embodiments for performing a user query on structured data transformed from unstructured data. As shown in FIG. 2, process 200 begins by receiving a user query (at 202). In some embodiments, a user query can be a user request for unstructured data in a structured format such as a relational database table. The user query in some embodiments can be a request to merge multiple unstructured data into a single structured database table.

Process 200 can request (at 204) unstructured data based on the user query. In some embodiments, a transformation module can request a set of unstructured data from an unstructured database. The user query can identify a set of parameters including a basket, an index, a particular time interval, etc. that the user may be interested in retrieving the unstructured data. In some embodiments, the transformation module can receive an argument in an SQL module for a search for unstructured data. The argument can specify an index or basket of information that includes the desired unstructured data (e.g., by using a search term). In some embodiments, the argument can further specify other criteria such as a time-interval. In response to receiving user specification of a set of arguments, the transformation module specifies a search in unstructured data format and requests for the corresponding unstructured data. Process 200 then receives (at 206) the unstructured data.

Process 200 can determine (at 208) a transformation configuration for the unstructured data. In some embodiments, the transformation configuration specifies a table with a set of table entries (i.e., a number of rows and columns) that can be populated with the unstructured data. Transforming the unstructured data into data compatible with the structured format enables users to perform various function calls and operations to manipulate the data using a format compatible with the structured data.

Process 200 can transform (at 210) the unstructured data into structured data. The transformation module can convert the unstructured data into structured data using the transformation configuration. In some embodiments, the transformation configuration specifies a table, a list, or any other data store that is compatible with a structured format. The transformation module can create a table in a structured database format based on a transformation configured determined at 208. The transformation module can populate the table with unstructured data corresponding to the entries in the table.

Process 200 can apply (at 212) the user query to the transformed structured data. While a transformation module part of the server can apply the user query to the transformed structured data, some embodiments enable a user device to receive the transformed structured data and apply the user query locally. Process 200 can then provide (at 214) the query results to the user.

III. Determination of a Transformation Configuration

As mentioned above, a transformation module in some embodiments can determine a transformation configuration in order to transform unstructured data into structured data. In some embodiments, the transformation configuration defines the structure of a data store (e.g., dimensions of a structured database or table). The transformation configuration can also specify a mapping of the unstructured data into the structured database. To transform unstructured data into structured data, the transformation module can identify the structure, create the structure, and map data in the unstructured data to the corresponding table entries. With a relational database table compatible with a structured format, the user can specify one or more operations in the structured format to be performed on the structured data.

Figure 3:
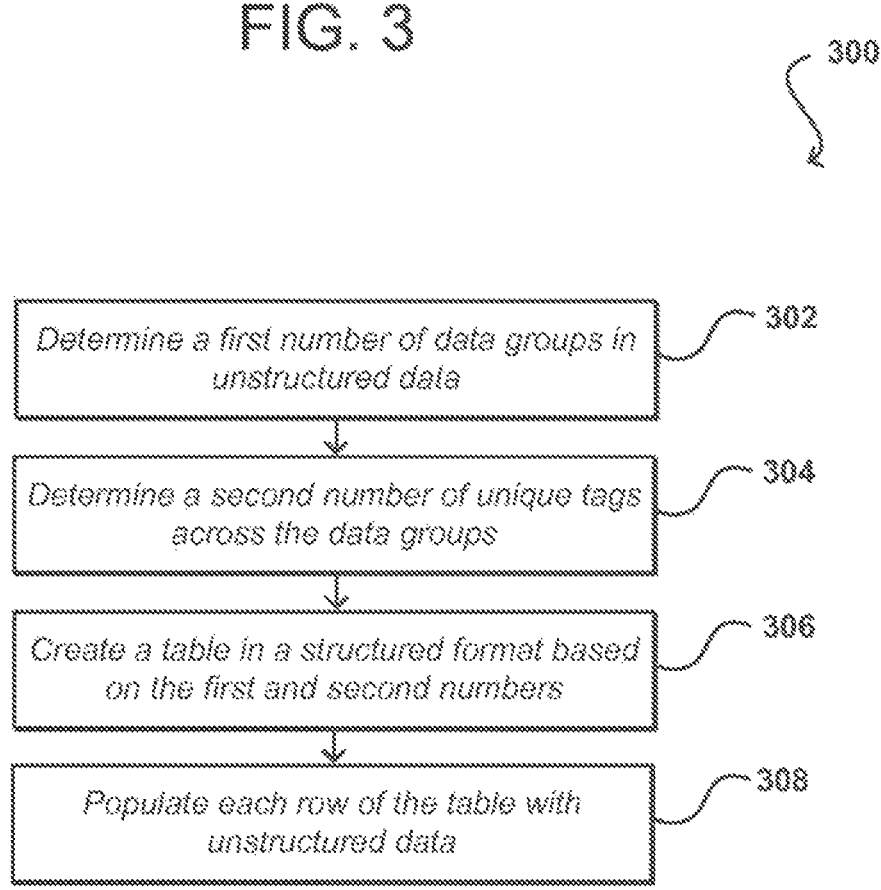
FIG. 3 illustrates a process of some embodiments for creation of a relational database table after receiving unstructured data.

FIG. 3 illustrates a process 300 of some embodiments for creation of a relational database table after receiving unstructured data. One of ordinary skill will recognize that process 300 can be performed at 208 and 210 of process 200 in some embodiments. Process 300 can determine (at 302) a first number of data groups in the unstructured data. In some embodiments, the first number of data groups in the unstructured data corresponds to the number of rows for a table to be created. The unstructured data received in some embodiments can include a set of data groups. Each data group can have one or more field values that are each associated with a tag. In some embodiments, each data group can be associated with a timestamp.

Process 300 can determine (at 304) a second number of unique tags across the data groups. In some embodiments, the second number of unique tags across the data groups corresponds to the number of columns for the table to be created. As each field value is associated with a tag, the transformation module can sweep through each field value across the data groups to identify the unique tags. That is, as the transformation module encounters a field value associated with a tag that has not been encountered during the sweep, a counter increases. The second number of unique tags can be identified by the total number of the counter after the transformation module sweeps through all the unstructured data across the data groups.

Process 300 can create (at 306) a table in a structured format based on the first and second numbers. As the first and second numbers represent the number of rows and columns of a table, the transformation module can create the table in a structured format using the first and second numbers. Process 300 can then populate (at 308) each entry within the table with unstructured data. The transformation module can insert null values into table entries that do not have a value corresponding to any unstructured data. When each entry within the database table is populated, the transformation is complete. The server can perform further operations on the populated table based upon the user query or further user requests.

Different embodiments may determine the transformation configuration for transforming the data differently. Instead of determining the number of columns in a table by identifying a number of unique identifiers in the unstructured data, some embodiments may determine the number of columns by identifying a number of data types in the set of unstructured data.

IV. Data Transformation for a Direct Search

In some embodiments, a user can perform a direct search for unstructured data using a user query specifying a set of parameters. Upon receiving the user query, a transformation module on the server side can retrieve a set of unstructured data and convert the unstructured data from an unstructured format into a structured format. For instance, the transformation module can retrieve a set of group data and reorganize the data such that the data is presented within a structured database table.

FIGS. 4A and 4B illustrate an example of a user query including a direct search for unstructured data and query results returned in a structured database format in accordance with some embodiments. As shown in FIG. 4A, the user has identified the parameters for the search in the arguments 402 of the user query. In this example, the various search parameters specified by the user includes an index, a time frame, a source type, etc. The user may specify additional parameters to narrow the search results and vice versa.

As described, a server may receive the user query and retrieve the corresponding unstructured data in response thereto. In some embodiments, the server can transform the unstructured data from an unstructured database format into a structured data in a structured database format. The user can specify the type of structured database and/or the structured database format into which the user would like the server to transform the unstructured data in some embodiments. As such, the server can transform the data accordingly.

FIG. 4B illustrates an example of query results that can be presented to the user where the query results includes structured data in a structured database format. As shown, the data is presented in a structured table 450. The query result returns the data in a structured database format instead of strings of data in an unstructured format. Although each table entry includes a value in this example, in some instances, not every table entry would include a value when transforming unstructured data to structured data. In such instances, the transformation module can return a null for those entries without a value.

V. Data Transformation for a Joined Search

In some embodiments, a user can use a single SQL statement to call the transformation function twice from the statement. After receiving the query results including two sets of structured data, the two sets of structured data can be joined to form a single set of structured data in a structured database. Some embodiments may request two sets of unstructured data from two separate searches, transform the data, and join the structured data in a structured database.

Figure 5A:
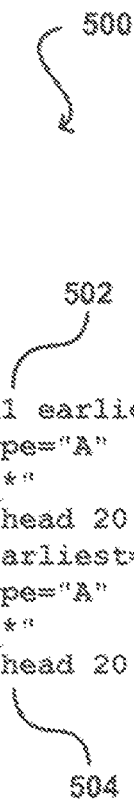
FIGS. 5A-5B illustrate an example of a user query that specifies two separate searches for two sets of unstructured data in accordance with one embodiment.
Figure 5B:
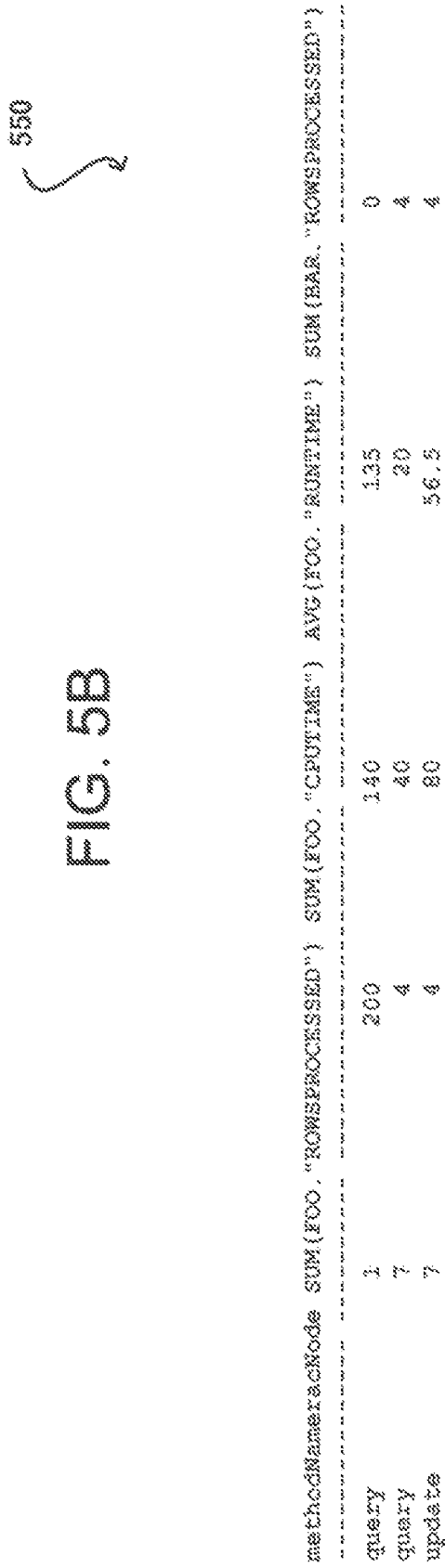

FIGS. 5A and 5B illustrate an example of a user query that specifies two separate searches for two sets of unstructured data in accordance with one embodiment. In some embodiments, the user query can specify two sets of parameters for two separate searches. A transformation module in some embodiments can retrieve two sets of unstructured data based on the two sets of parameters, transform the unstructured data, and join the two sets of data. In other embodiments, the transformation module can retrieve the unstructured data sets and join the unstructured data. In such embodiments, the transformation module can transform the joined unstructured data and present the joined transformed data to the user.

In FIG. 5A, the user has specified two sets of parameters for two sets of unstructured data in the arguments 502 and 504 of the user query. Similar to the direct search in FIG. 4A, the search parameters for each search can include an index, a time frame, a source type, etc. FIG. 5B shows a join of two sets of data retrieved from the unstructured database. In some embodiments, the joined data is the query result that can be presented to the user. The query results can return a single structured database 550 that includes the unstructured data from the two separate searches combined. In some embodiments, the same results may be achieved using multiple user queries, two of which perform individual searches and transformations, and one of which joins the two sets of structured data sets. The user may specify additional user queries to perform a set of operations on the joined data structure.

VI. Joining Unstructured and Structured Data

In some embodiments, a user can join query data from two or more tables where at least one of the tables includes data transformed from unstructured data. FIGS. 6A and 6B illustrate an example of user query that retrieves and joins unstructured data with structured data in accordance with one embodiment. In FIG. 6A, the user has specified a set of parameters for a search for unstructured data in arguments 602 of the user query. As described above, a transformation module can transform the retrieved unstructured data into structured data.

The user can specify additional user queries that can perform additional operations on the transformed data, such as a join operation, as shown in this example. Upon specifying a join operation using structured data language, data from the table that includes the transformed data and from another table can be joined to form another structured database table with the desired data. FIG. 6B shows the joined data in a structured database table 650.

In some embodiments, each piece of data in the table can be associated with a data type, such as a character string, a data and time, a binary string, a numeric, etc. After unstructured data is transformed into structured data, a security module can sweep through the structured data and identify the data type for each piece of data. As such, the security module can determine whether the data types for entries in a column correspond to each other. In some embodiments, when the security module determines that there are values in a column that have different data types, the security module may flag the transformed data. A user can then verify whether the unstructured data was transformed into structured data appropriately. This ensures that the user queries performed on the transformed structured data would likely be accurate.

VII. System Overview

In certain embodiments, the methods and systems are implemented in a multi-tenant database system or service. As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the terms query or query plan refer to a set of steps used to access information in a database system.

Figure 7:
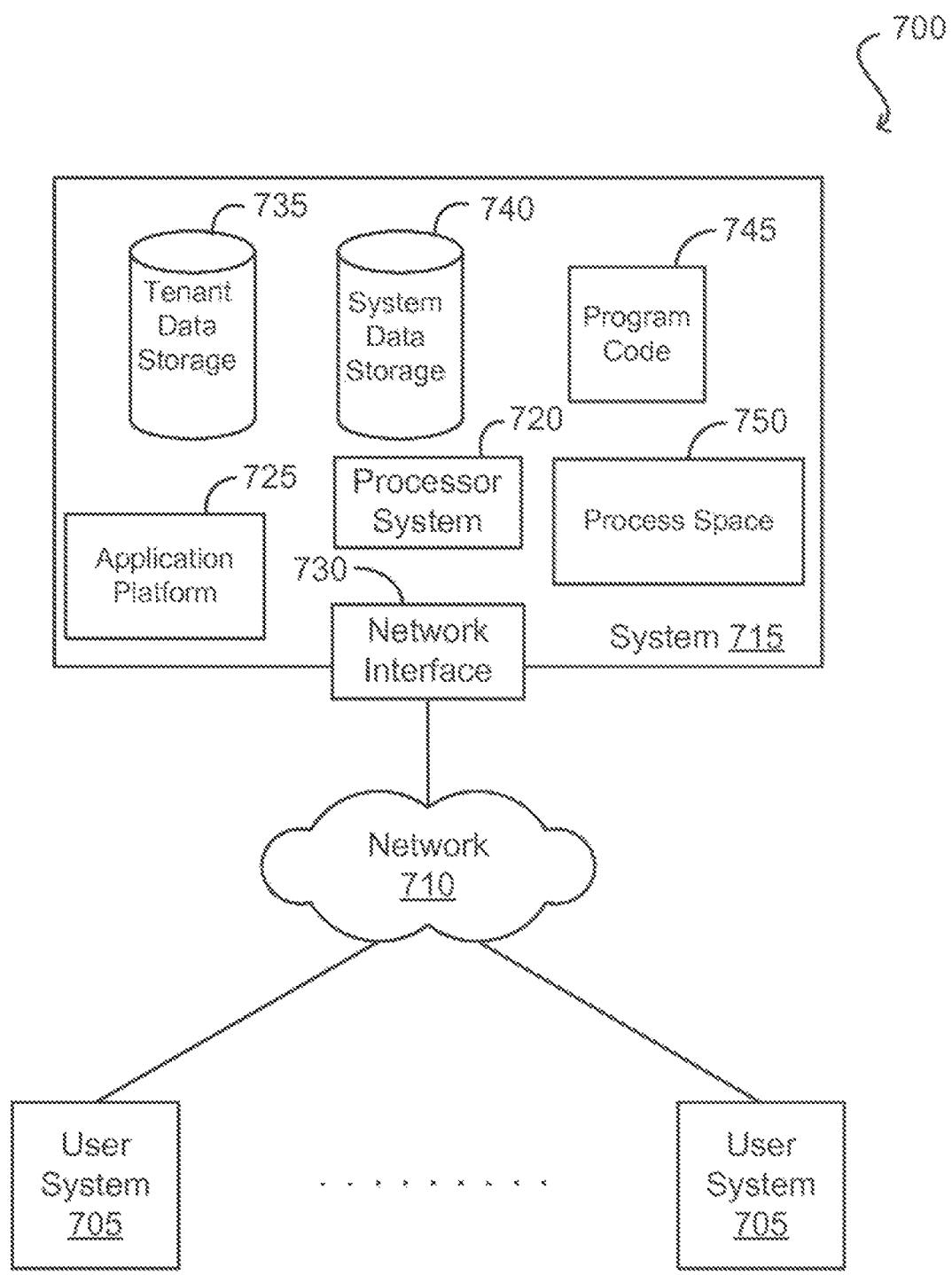
FIG. 7 illustrates a block diagram of an environment wherein an on-demand database service might be used.

FIG. 7 illustrates a block diagram of an environment 700 wherein an on-demand database service might be used. Environment 700 may include user systems 705, network 710, and system 715, which may comprise processor system 720, application platform 725, network interface 730, tenant data storage 735, system data storage 740, program code 745, and process space 750. In other embodiments, environment 700 may not have all of the components listed and/or may have other elements instead of, or in addition to, those listed above.

Environment 700 is an environment in which an on-demand database service exists. User system 705 may be any machine or system that is used by a user to access a database user system. For example, any of user systems 705 can be a handheld computing device, a mobile phone, a laptop computer, a work station, and/or a network of computing devices. As illustrated in FIG. 7 (and in more detail in FIG. 8) user systems 705 might interact via a network 710 with an on-demand database service, which is system 715.

An on-demand database service, such as system 715, is a database system that is made available to outside users that do not need to be necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 715" and "system 715" will be used interchangeably herein. A database image may include one or more database objects. A relational database management system (RDBMS) or the equivalent may execute storage and retrieval of information against the database object(s). Application platform 725 may be a framework that allows the applications of system 715 to run, such as the hardware and/or software, e.g., the operating system. In an embodiment, on-demand database service 715 may include an application platform 725 that enables creation, managing and executing one or more applications developed by the provider of the on-demand database service, users accessing the on-demand database service via user systems 705, or third party application developers accessing the on-demand database service via user systems 705.

The users of user systems 705 may differ in their respective capacities, and the capacity of a particular user system 705 might be entirely determined by permissions (permission levels) for the current user. For example, where a salesperson is using a particular user system 705 to interact with system 715, that user system has the capacities allotted to that salesperson. However, while an administrator is using that user system to interact with system 715, that user system has the capacities allotted to that administrator. In systems with a hierarchical role model, users at one permission level (profile type) may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 710 is any network or combination of networks of devices that communicate with one another. For example, network 710 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it may be understood that the networks that the present invention might use are not so limited, although TCP/IP is a frequently implemented protocol.

User systems 705 might communicate with system 715 using TCP/IP and, at a higher network level, use other common Internet protocols to communicate, such as HTTP, FTP, AFS, WAP, etc. In an example where HTTP is used, user system 705 might include an HTTP client commonly referred to as a "browser" for sending and receiving HTTP messages to and from an HTTP server at system 715. Such an HTTP server might be implemented as the sole network interface between system 715 and network 710, but other techniques might be used as well or instead. In some implementations, the interface between system 715 and network 710 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 715, shown in FIG. 7, implements a web-based customer relationship management (CRM) system. For example, in one embodiment, system 715 includes application servers configured to implement and execute CRM software applications as well as provide related data, code, forms, webpages and other information to and from user systems 705 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 715 implements applications other than, or in addition to, a CRM application. For example, system 715 may provide tenant access to multiple hosted (standard and custom) applications, including a CRM application. User (or third party developer) applications, which may or may not include CRM, may be supported by the application platform 725, which manages creation, storage of the applications into one or more database objects and executing of the applications in a virtual machine in the process space of the system 715.

One arrangement for elements of system 715 is shown in FIG. 7, including a network interface 730, application platform 725, tenant data storage 735 for tenant data, system data storage 740 for system data accessible to system 715 and possibly multiple tenants, program code 745 for implementing various functions of system 715, and a process space 750 for executing MTS system processes and tenant-specific processes, such as running applications as part of an application hosting service. Additional processes that may execute on system 715 include database indexing processes.

Several elements in the system shown in FIG. 7 include conventional, well-known elements that are explained only briefly here. For example, each user system 705 could include a desktop personal computer, workstation, laptop, PDA, cell phone, or any wireless access protocol (WAP) enabled device or any other computing device capable of interfacing directly or indirectly to the Internet or other network connection. User system 705 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 705 to access, process and view information, pages and applications available to it from system 715 over network 710. Each user system 705 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 715 or other systems or servers. For example, the user interface device can be used to access data and applications hosted by system 715, and to perform searches on stored data, and otherwise allow a user to interact with various GUI pages that may be presented to a user. As discussed above, embodiments are suitable for use with the Internet, which refers to a specific global internetwork of networks. However, it may be understood that other networks can be used instead of the Internet, such as an intranet, an extranet, a virtual private network (VPN), a non-TCP/IP based network, any LAN or WAN or the like.

According to one embodiment, each user system 705 and all of its components are operator configurable using applications, such as a browser, including computer code run using a central processing unit such as an Intel Pentium® processor or the like. Similarly, system 715 (and additional instances of an MTS, where more than one is present) and all of their components might be operator configurable using application(s) including computer code to run using a central processing unit such as processor system 720, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 715 is configured to provide webpages, forms, applications, data and media content to user (client) systems 705 to support the access by user systems 705 as tenants of system 715. As such, system 715 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It may also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 8:
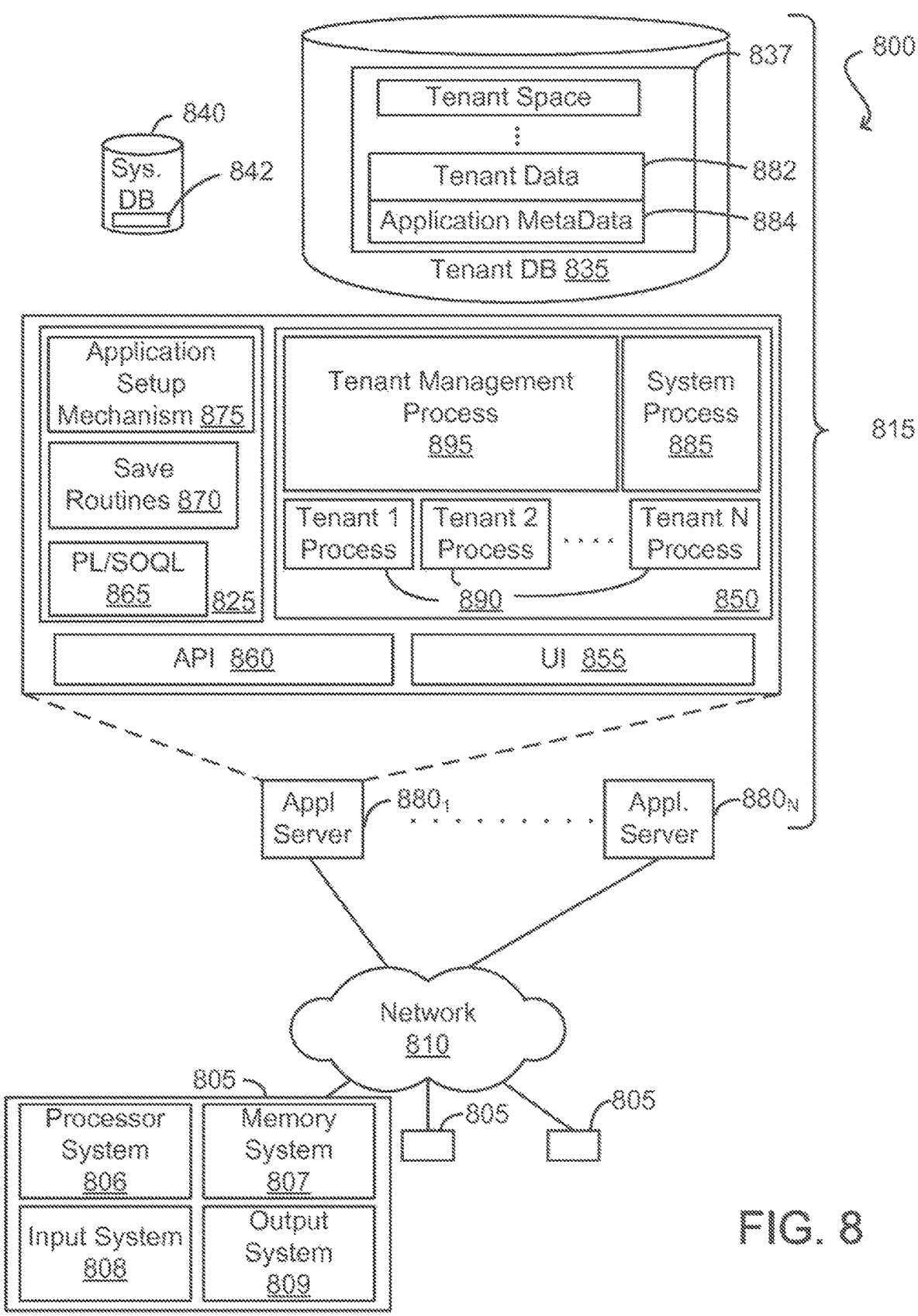
FIG. 8 illustrates a block diagram of an embodiment of elements of FIG. 7 and various possible interconnections between these elements according to an embodiment of the present invention.

FIG. 8 also illustrates environment 800. However, in FIG. 8 elements of system 115 and various interconnections in an embodiment are further illustrated. FIG. 8 shows that user system 805 may include processor system 806, memory system 807, input system 808, and output system 809. FIG. 8 shows network 810 and system 815. FIG. 8 also shows that system 815 may include tenant data storage 835, tenant data 837, system data storage 840, system data 842, User Interface (UI) 855, Application Program Interface (API) 860, PL/SOQL 865, save routines 870, application setup mechanism 875, applications servers $880_1$-$880_N$, system process space 885, tenant process spaces 890, tenant management process space 895, tenant storage area, user storage, and application metadata. In other embodiments, environment 800 may not have the same elements as those listed above and/or may have other elements instead of, or in addition to, those listed above.

User system 805, network 810, system 815, tenant data storage 835, and system data storage 840 were discussed above in FIG. 7. Regarding user system 805, processor system 806 may be any combination of one or more processors. Memory system 807 may be any combination of one or more memory devices, short term, and/or long term memory. Input system 808 may be any combination of input devices, such as one or more keyboards, mice, trackballs, scanners, cameras, and/or interfaces to networks. Output system 809 may be any combination of output devices, such as one or more monitors, printers, and/or interfaces to networks. As shown by FIG. 8, system 815 may include a network interface 810 (similar to network 710 of FIG. 7) implemented as a set of HTTP application servers 880, an application platform 825, tenant data storage 835, and system data storage 840. Also shown is system process space 850, including individual tenant process spaces 890 and a tenant management process space 895. Each application server 880 may be configured to tenant data storage 835 and the tenant data 837 therein, and system data storage 840 and the system data 842 therein to serve requests of user systems 805. The tenant data 837 might be divided into individual tenant storage areas, which can be either a physical arrangement and/or a logical arrangement of data. Within each tenant storage area 837, user storage 882 and application metadata 884 might be similarly allocated for each user. For example, a copy of a user's most recently used (MRU) items might be stored to user storage 882. Similarly, a copy of MRU items for an entire organization that is a tenant might be stored to tenant storage area 837. A UI 855 provides a user interface and an API 860 provides an application programmer interface to system 815 resident processes to users and/or developers at user systems 805. The tenant data and the system data may be stored in various databases, such as one or more Oracle™ databases.

Application platform 825 includes an application setup mechanism 875 that supports application developers' creation and management of applications, which may be saved as metadata into tenant data storage 835 by save routines 870 for execution by subscribers as one or more tenant process spaces 890 managed by tenant management process 895 for example. Invocations to such applications may be coded using PL/SOQL 865 that provides a programming language style interface extension to API 860. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, and hereby incorporated in its entirety herein for all purposes. Invocations to applications may be detected by one or more system processes, which manages retrieving application metadata 884 for the subscriber making the invocation and executing the metadata as an application in a virtual machine.

Each application server 880 may be communicably coupled to database systems, e.g., having access to system data 842 and tenant data 837, via a different network connection. For example, one application server $880_1$ might be coupled via the network 810 (e.g., the Internet), another application server $880_{N-1}$ might be coupled via a direct network link, and another application server $880_N$ might be coupled by yet a different network connection. Transfer Control Protocol and Internet Protocol (TCP/IP) are typical protocols for communicating between application servers 880 and the database system. However, it will be apparent to one skilled in the art that other transport protocols may be used to optimize the system depending on the network interconnect used.

In certain embodiments, each application server 880 is configured to handle requests for any user associated with any organization that is a tenant. Because it is desirable to be able to add and remove application servers from the server pool at any time for any reason, there is preferably no server affinity for a user and/or organization to a specific application server 880. In one embodiment, therefore, an interface system implementing a load balancing function (e.g., an F5 Big-IP load balancer) is communicably coupled between the application servers 880 and the user systems 805 to distribute requests to the application servers 880. In one embodiment, the load balancer uses a least connections algorithm to route user requests to the application servers 880. Other examples of load balancing algorithms, such as round robin and observed response time, also can be used. For example, in certain embodiments, three consecutive requests from the same user could hit three different application servers 880, and three requests from different users could hit the same application server 880. In this manner, system 815 is multi-tenant, wherein system 815 handles storage of, and access to, different objects, data and applications across disparate users and organizations.

As an example of storage, one tenant might be a company that employs a sales force where each salesperson uses system 815 to manage their sales process. Thus, a user might maintain contact data, leads data, customer follow-up data, performance data, goals and progress data, etc., all applicable to that user's personal sales process (e.g., in tenant data storage 835). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 815 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 815 might also maintain system level data usable by multiple tenants or other data. Such system level data might include industry reports, news, postings, and the like that are sharable among tenants.

In certain embodiments, user systems 805 (which may be client systems) communicate with application servers 880 to request and update system-level and tenant-level data from system 815 that may require sending one or more queries to tenant data storage 835 and/or system data storage 840. System 815 (e.g., an application server 880 in system 815) automatically generates one or more SQL statements (e.g., one or more SQL queries) that are designed to access the desired information. System data storage 840 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It may be understood that "table" and "object type" may be used interchangeably herein. Each table generally contains one or more data categories logically arranged as columns or fields in a viewable schema. Each row or record of a table contains an instance of data for each category (type) defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, Opportunity data, and other object types, each containing predefined fields. It may be understood that the word "entity" may also be used interchangeably herein with "object" and "table", when entity or object is referring to a collection of objects or entities of a particular type.

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM," issued Aug. 17, 2010 to Craig Weissman, and hereby incorporated herein by reference, includes discussion on systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for accessing data, the method comprising:
   receiving a user query from a user device, the user query in a first structured database query format configured to be utilized with a database storing data in a structured format;
   retrieving, in response to receiving the user query, unstructured data from a second database that stores data in an unstructured format, wherein requested unstructured data is a subset of the unstructured data stored in the second database;
   organizing the retrieved unstructured data as a set of data groups, each data group having a set of one or more values, each value of a respective data group being associated with a different tag;
   determining, with a computer system, a first number of data groups in the unstructured data;
   determining, with the computer system, a second number of unique tags across the data groups of the unstructured data;
   creating, with the computer system, a table in the structured format in the first first database having a number of columns based on the second number of unique tags, and a number of rows corresponding to the first number of data groups;
   populating each row of the table in the first database with the retrieved unstructured data by adding each value to the column corresponding to the associated tag;
   applying the user query to the table having the retrieved data in the first database format to obtain a query result; and
   transmitting the query result to the user device.

2. The method of claim 1, wherein the unstructured data is time series-based, wherein receiving the user query for unstructured data includes receiving a specified time interval for the unstructured data.

3. The method of claim 1, wherein the table includes a set of entries and wherein populating each row of the table includes inserting a null value in a subset of entries that does not have a corresponding value from the unstructured data.

4. The method of claim 1 further comprising:
   joining a set of data associated with the first database format with the table to generate joined data, wherein the joined data includes the set of data and the unstructured data and wherein the joined data is malleable based on function calls in the first database format.

5. The method of claim 1, wherein the first database format is a relational database format and the second database format is an unstructured database format.

6. The method of claim 1, wherein the unstructured data is log data from an event log.

7. The method of claim 1, wherein each of the set of data groups is associated with a timestamp.

8. The method of claim 1 further comprising:
   determining a data type for each data in the set of data group; and
   verifying that the data type for each data in each column of the table matches.

9. A non-transitory computer readable storage medium having stored thereon program instructions that, when executed, cause a processor in a computing device to:
   receive a user query from a user device, the user query in a first structured database query format configured to be utilized with a database storing data in having a structured format;
   retrieve, in response to receiving the user query, unstructured data from a second database that stores the data in an unstructured format, wherein requested unstructured data is a subset of the unstructured data stored in the second database;
   organize the retrieved unstructured data as a set of data groups, each data group having a set of one or more values, each value of a respective data group being associated with a different tag;
   determine, with a computer system, a first number of data groups in the unstructured data;
   determine, with the computer system, a second number of unique tags across the data groups of the unstructured data;
   create, with the computer system, a table in the structured format in the first first database having a number of columns based on the second number of unique tags, and a number of rows corresponding to the first number of data groups;
   populate each row of the table in the first database format with the retrieved unstructured data by adding each value to the column corresponding to the associated tag;
   apply the user query to the table having the retrieved data in the first database format to obtain a query result; and
   transmit the query result to the user device.

10. The non-transitory computer readable storage medium of claim 9, wherein the unstructured data is time series-based, wherein receiving the user query for unstructured data includes receiving a specified time interval for the unstructured data.

11. The non-transitory computer readable storage medium of claim 9, wherein the table includes a set of entries and wherein populating each row of the table includes inserting a null value in a subset of entries that does not have a corresponding value from the unstructured data.

12. The non-transitory computer readable storage medium of claim 9, wherein the method further comprises:
joining a set of data associated with the first database format with the table to generate joined data, wherein the joined data includes the set of data and the unstructured data and wherein the joined data is malleable based on function calls in the first database format.

13. The non-transitory computer readable storage medium of claim 9, wherein the first database format is a relational database format and the second database format is an unstructured database format.

14. The non-transitory computer readable storage medium of claim 9, wherein the unstructured data is log data from an event log.

15. A system comprising:
a processor; and
a memory device including instructions that, when executed by the processor, cause the system to:
receive a user query from a user device, the user query in a first structured database query format configured to be utilized with a database storing data in a structured format;
retrieve, in response to receiving the user query, unstructured data from a second database that stores in an unstructured format, wherein requested unstructured data is a subset of the unstructured data stored in the second database;
organize the retrieved unstructured data as a set of data groups, each data group having a set of one or more values, each value of a respective data group being associated with a different tag;
determine, with a computer system, a first number of data groups in the unstructured data;
determine, with the computer system, a second number of unique tags across the data groups of the unstructured data;
create, with the computer system, a table in the structured format in the first first database having a number of columns based on the second number of unique tags, and a number of rows corresponding to the first number of data groups;
populate each row of the table in the first database with the retrieved unstructured data by adding each value to the column corresponding to the associated tag;
apply the user query to the table having the retrieved data in the first database format to obtain a query result; and
transmit the query result to the user device.

16. The system of claim 15, wherein the unstructured data is time series-based, wherein receiving the user query for unstructured data includes receiving a specified time interval for the unstructured data.

17. The system of claim 15, wherein the table includes a set of entries and wherein populating each row of the table includes inserting a null value in a subset of entries that does not have a corresponding value from the unstructured data.

18. The system of claim 15, wherein the memory device includes further instructions that cause the system to:
join a set of data associated with the first database format with the table to generate joined data, wherein the joined data includes the set of data and the unstructured data and wherein the joined data is malleable based on function calls in the first database format.

19. The system of claim 15, wherein the first database format is a relational database format and the second database format is an unstructured database format.

20. The system of claim 15, wherein the unstructured data is log data from an event log.

* * * * *